US008885823B2

(12) United States Patent
Poli et al.

(10) Patent No.: US 8,885,823 B2
(45) Date of Patent: Nov. 11, 2014

(54) METHOD AND APPARATUS FOR DELIVERING ENCRYPTED ON-DEMAND CONTENT WITHOUT USE OF AN APPLICATION DEFINED PROTOCOL

(75) Inventors: Christopher Poli, Doylestown, PA (US); Joseph M. Amorese, Sellersville, PA (US); Robert Mack, Collegeville, PA (US); Lawrence D. Vince, Lansdale, PA (US); Charles A. Zimmerman, Mount Laurel, NJ (US)

(73) Assignee: General Instrument Corporation, Horsham, PA (US)

( * ) Notice: Subject to any disclaimer, the term of this patent is extended or adjusted under 35 U.S.C. 154(b) by 1059 days.

(21) Appl. No.: 11/859,862

(22) Filed: Sep. 24, 2007

(65) Prior Publication Data

US 2008/0075285 A1  Mar. 27, 2008

Related U.S. Application Data

(60) Provisional application No. 60/846,947, filed on Sep. 25, 2006.

(51) Int. Cl.
*H04N 7/00* (2011.01)
*H04N 7/173* (2011.01)
*H04N 7/167* (2011.01)
*H04N 21/2389* (2011.01)
*H04N 21/472* (2011.01)
*H04N 21/6408* (2011.01)

(52) U.S. Cl.
CPC ......... *H04N 7/17318* (2013.01); *H04N 7/1675* (2013.01); *H04N 21/23895* (2013.01); *H04N 21/47202* (2013.01); *H04N 21/6408* (2013.01)
USPC ............. 380/211; 380/37; 380/212; 380/217; 380/252; 380/255; 725/31; 725/23; 725/151; 725/91; 725/95; 726/4; 713/153; 713/154; 713/160; 713/168; 705/51

(58) Field of Classification Search
USPC .................. 380/211, 212, 217, 252, 255, 37; 725/87, 23, 31, 91, 95, 151; 713/153, 713/154, 160, 168; 726/4; 705/51
See application file for complete search history.

(56) References Cited

U.S. PATENT DOCUMENTS

| 7,043,022 | B1* | 5/2006 | Blanchard et al. | 380/252 |
| 7,454,610 | B2* | 11/2008 | Buer et al. | 713/153 |
| 7,590,237 | B2* | 9/2009 | Krause et al. | 380/37 |
| 7,861,075 | B2* | 12/2010 | Brendel | 713/153 |
| 2002/0083438 | A1* | 6/2002 | So et al. | 725/31 |
| 2002/0087971 | A1* | 7/2002 | Cochran et al. | 725/31 |

(Continued)

*Primary Examiner* — Beemnet Dada
*Assistant Examiner* — Sayed Beheshti Shirazi
(74) *Attorney, Agent, or Firm* — Lori Anne D. Swanson

(57) ABSTRACT

A method for delivering encrypted content to a subscriber terminal on-demand through a communication network is provided. The method begins when SRM receives a request for content from the subscriber terminal. In response to the request, the SRM directs a video server to transmit the content as an unencrypted transport stream to an encryptor. The packets in the unencrypted transport stream include a header with a destination address associated with the subscriber terminal. The encryptor encrypts the content in the unencrypted transport stream to generate an encrypted transport stream. The encryptor also inserts in the packet headers of the packets in the encrypted transport stream the destination address associated with the subscriber terminal obtained from the packet headers in the unencrypted transport stream. Finally, the encrypted transport stream is transmitted to the subscriber terminal over the communication network.

16 Claims, 4 Drawing Sheets

(56) References Cited

U.S. PATENT DOCUMENTS

| | | |
|---|---|---|
| 2002/0100059 A1* | 7/2002 | Buehl et al. .................. 725/116 |
| 2002/0161927 A1* | 10/2002 | Inoue et al. .................. 709/245 |
| 2003/0018917 A1* | 1/2003 | Brown, Sr. .................... 713/201 |
| 2003/0088876 A1* | 5/2003 | Mao et al. ....................... 725/91 |
| 2003/0123473 A1* | 7/2003 | Satoh et al. ................... 370/442 |
| 2004/0019900 A1* | 1/2004 | Knightbridge et al. ......... 725/23 |
| 2004/0073954 A1* | 4/2004 | Bjordammen et al. ....... 725/151 |
| 2004/0103437 A1* | 5/2004 | Allegrezza et al. ............. 725/95 |
| 2004/0128553 A1* | 7/2004 | Buer et al. ..................... 713/201 |
| 2005/0010754 A1* | 1/2005 | Brendel ......................... 713/153 |
| 2005/0055718 A1 | 3/2005 | Stone |
| 2005/0105732 A1* | 5/2005 | Hutchings et al. ............ 380/255 |
| 2005/0122976 A1* | 6/2005 | Poli et al. ...................... 370/392 |
| 2005/0129233 A1 | 6/2005 | Pedlow, Jr. |
| 2005/0157877 A1 | 7/2005 | Chen et al. |
| 2005/0180568 A1* | 8/2005 | Krause .......................... 380/212 |
| 2005/0278760 A1 | 12/2005 | Dewar et al. |
| 2005/0286520 A1 | 12/2005 | Oz et al. |
| 2006/0002551 A1* | 1/2006 | Brown et al. .................. 380/217 |
| 2006/0130107 A1 | 6/2006 | Gonder et al. |
| 2006/0159264 A1 | 7/2006 | Chen et al. |
| 2006/0184789 A1* | 8/2006 | Karasawa et al. ............. 713/160 |
| 2006/0218604 A1 | 9/2006 | Riedl et al. |
| 2006/0293991 A1 | 12/2006 | Jenzowsky et al. |
| 2007/0006253 A1 | 1/2007 | Pinder et al. |
| 2007/0022459 A1 | 1/2007 | Gaebel, Jr. et al. |
| 2007/0101134 A1* | 5/2007 | Parlan et al. .................. 713/168 |
| 2008/0154775 A1* | 6/2008 | Soukup ........................... 705/51 |

* cited by examiner

METHOD AND APPARATUS FOR DELIVERING ENCRYPTED ON-DEMAND CONTENT WITHOUT USE OF AN APPLICATION DEFINED PROTOCOL

STATEMENT OF RELATED APPLICATIONS

This application claims the benefit of U.S. Provisional Patent Application Ser. No. 60/846,947, filed Sep. 25, 2006, entitled "Method and System To Deliver Encrypted IP VOD Sessions Without Application Defined Protocol," which is incorporated by reference herein in its entirety.

FIELD OF THE INVENTION

The present invention relates generally to on-demand systems such as video on-demand systems and switched digital video systems for distributing content to a subscriber over a system such as a satellite or cable television system, and more particularly to a on-demand system in which the content is encrypted prior to delivery to the subscriber.

BACKGROUND OF THE INVENTION

A video on demand service permits a viewer to order a movie or other video program material for immediate viewing. In a typical broadcast satellite or cable television (CATV) system, the viewer is presented with a library of video choices. The VOD program material, such as for example movies, are referred to herein as assets, programs or content. The viewer may be able to search for desired content by sorting the library according to actor, title, genre or other criteria before making a selection. In general, assets, programs and content include audio files, images and/or text as well as video.

In a VOD system, a portion of the CATV spectrum may be dedicated (on a per use basis) to transmit the requested video to the subscriber. Instead of using a portion of the CATV spectrum, another transport path such as an IP path may be used. The practice of assigning a portion of the CATV spectrum on a temporary basis is known as narrowcasting. Likewise, an IP path would be implemented using singlecast IP addressing. Since the assigned video channel is dedicated to one viewer, VCR-like commands are possible. That is, for example, the purchased video may be paused, fast-forwarded, rewound or played in slow motion. Various vendors, known as VOD suppliers, provide systems and software that enable CATV operators to offer a VOD service to their subscribers.

In a typical VOD system, an application software component (known as the VOD client) resides in the CATV set-top box (STB) at the viewer's home. A typical VOD system further includes a VOD server, which is a memory intensive system that stores VOD content at the headend and generates the VOD video stream for each subscriber. The video inventory in the VOD server may contain thousands of titles. The VOD server further generates one VOD video stream for each active VOD viewer. There may be thousands of simultaneous active VOD viewers. A VOD pump streams the VOD content from the VOD server. In addition to a VOD pump, a typical VOD system includes a VOD asset management system, a resource management system, a VOD business management system and a conditional access system.

The VOD asset management system generates lists of movies or other content that are available for VOD purchase. The VOD client communicates requests to the VOD management system at the CATV headend and the resource management system sets up the VOD pump to transmit the movie to the viewer. The resource manager also provides tuning information to the set-top via the appropriate VOD server element. Also, for billing purposes, the VOD business management system records the event of a video purchase and communicates the purchase event to a billing system through which the viewer pays for the video purchase.

The system implementing VOD often provides the capability to limit content access to authorized subscribers only, as the content is delivered as part of the service are generally considered valuable intellectual properties by their owners. In cable and satellite television, such capability is known as conditional access. Conditional access requires a trustworthy mechanism for classifying subscribers into different classes, and an enforcement mechanism for denying access to unauthorized subscribers. Encryption is typically the mechanism used to deny unauthorized access to content (as opposed to denying access to the carrier signal).

To use conditional access with VOD systems, the content may be pre-encrypted before it is stored on the video server. Pre-encryption requires preprocessing content as it is transferred from the content owner to the cable operator. This may require an additional memory cache requirement for processing and transporting the content.

In addition, the management and distribution of encryption keys is also required as part of a VOD session, possibly requiring the use of an Encryption Renewal System. Depending on the particular implementation, there may also be the need for additional processing of the outgoing pre-encrypted streams. Alternatively, if real-time encryption during an on-demand session is employed using industry standard architectures, an enhanced resource manager is needed to coordinate the operation of the VOD servers, encryptors and the set top boxes. In particular, the resource manager interfaces with the VOD servers for session signaling protocol conversion with the set-top box, including session setup and tear down. The resource manager still performs such functions as determining the bandwidth required for given session and allocating the necessary frequency spectrum as required for the session. The resource manager also communicates the assigned VOD channel to the VOD client in the set-top box. In such manner, the set-top-box tuner is able to tune to the channel containing the video that was ordered by the subscriber. In addition, the resource manager must coordinate encryption resources for delivering the VOD stream, which is not necessary in existing pre-encryption system.

Accordingly, in implementing a real-time encryption VOD system, the communication between the VOD servers, distribution networks, encryptors and the set top boxes requires a relatively complex set of protocols to implement. The protocols employed between the VOD servers, distribution networks, and set-top boxes has largely been developed and deployed. On the other hand, the protocols used between the resource manager, VOD server and encryptors present a number of problems, because the protocols will generally need to be different for VOD servers supplied by different vendors. As a result, the VOD operator may be forced to delay introduction of certain features and implementations until they are supported by the incumbent VOD vendor or the operator may have to wait for a specific implementation to be supported by the VOD vendor.

DETAILED DESCRIPTION

Figure 1:
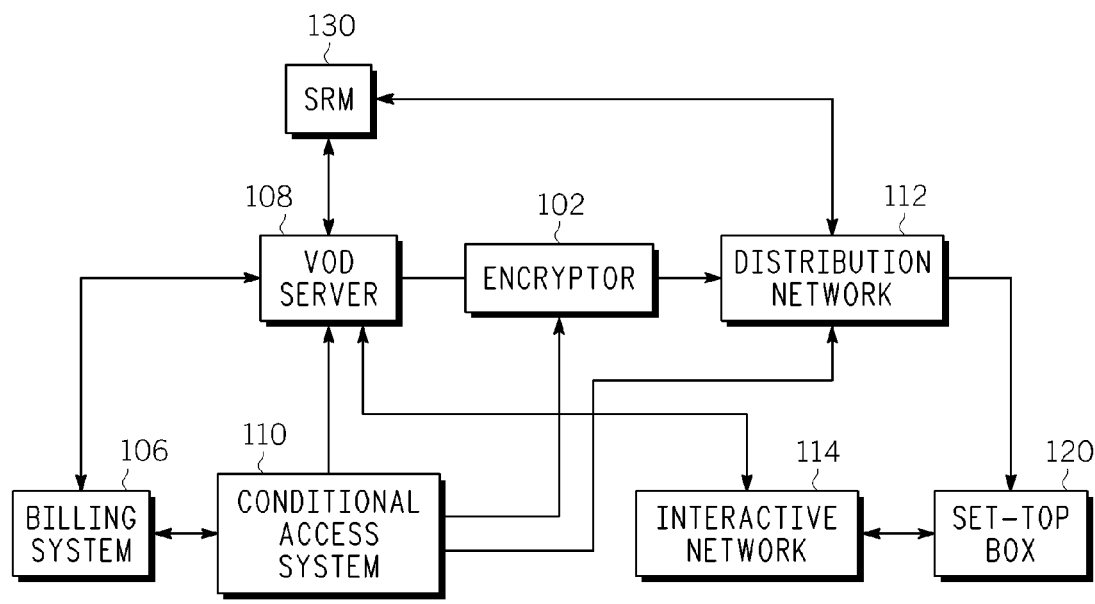
FIG. 1 shows one example of a system architecture for delivering encrypted video on-demand content to a subscriber during a video on-demand (VOD) session.

FIG. 1 is a system architecture 100 for delivering encrypted video on-demand content to a subscriber during a video on-demand (VOD) session. The VOD session is implemented through a service offering in which application level data generated by the set-top box 120 initiates a VOD session request and the session resource manager (SRM) 130 routes data in accordance with the request to provision the service without the need to communicate with the encryptor 102. Among other components, system architecture 100 comprises a video on-demand server 108 storing programs or other content for distribution to subscribers on an on-demand basis, an encryptor 102 for encrypting the content, a conditional access system 110 for controlling one or more keys granting access to encrypted content, a distribution network 112 for distributing content to set-top boxes (STB) such as STB 120, an interactive network 114 providing two-way interaction between the subscriber, the content system, and a Session Resource Manager (SRM) 130 for managing system resources. Although not shown, one of ordinary skill in the art would realize that other components and arrangements for achieving the various functionalities of system architecture 100 are possible. For example, a VOD system may be coupled directly to conditional access system (CAS) 110 and functionalities consolidated in both components since both components are typically located within a cable system head end.

Encryptor 102 is a facility that functions to encrypt digitally encoded content according to the specifications of the CAS 110. More particularly, encryptor 102 may be referred to as a transport encryptor. Transport encryptor 102 receives incoming encrypted content streams from the VOD system in the form of transport packets. The packets include a header in which a destination address (e.g., an IP or other network address) is located. The destination address is the address of the set-top box that has requested the content, or in some cases, the address of a network element in distribution network 112, which in turn forwards the packet to the set-top box. After encrypting the content, the transport encryptor 102 outputs encrypted packets that have headers that include the same destination address as the incoming packets.

The transport encryptor 102 should maintain the packet order from the reception to the distribution, either on a per stream basis or a destination address basis. This may be accomplished using a variety of mechanisms that may be selected based on the specific internal architecture of the transport encryptor. For example, every incoming packet may be designated (e.g., in the packet header) with a tag or other indicator that is sequentially incremented for each subsequently received packet. In this way the individual packet can be processed in any efficient manner using any internal resource of the transport encryptor that is available. That is, packets do not need to be processed serially because the tags can be used to reconstruct the outgoing encrypted stream. That is, the transport encryptor receives unencrypted packets, encrypts them, and outputs them in the same order to the same destination IP address that was included with the incoming unencrypted packet.

In some cases the encryption process involves generating one or a series of cryptographic keys. As part of the encryption process, the cryptographic keys, or the parameters used in their generation, are saved in a data structure called an encryption record. The encryption record is protected by encryption to prevent unauthorized access to the keys. Encryptor 102 may package encrypted programs with the associated encryption records, which may additionally contain useful but nonessential information about the content. Such information may include program title, identification of the program assigned by different parties, encoding parameters, program length, etc.

If the transport encryptor 102 generates cryptographic keys that are used to encrypt content, it may also accept encryption control provisioning parameters from the Conditional Access System 110, including cryptographic information to support content encryption; selecting one or more cryptographic keys based on the encryption control parameters and system configuration, which keys are used for encrypting the content. The encryptor 102 also generates an encryption record, which contains information about the keys used to encrypt the content. The record itself is encrypted to maintain the security of the encryption record. Finally, the encryptor 102 encrypts the program content using the chosen keys and inserts Encryption Control Messages into the stream so that an authorized set-top will be capable of decrypting the content.

VOD server 108 comprises one or more VOD servers adapted for video on-demand applications. The servers store programs for distribution to subscribers on an on-demand basis. Thereafter, the programs are routed and streamed to the authorized subscribers via the transport encryptor 102. In addition, VOD server 108 accepts purchase requests from subscriber terminals, and validates such purchase requests as appropriate. In some instances, after a purchase request is approved, the VOD purchases may be temporarily stored until requested by the subscriber. VOD server 108 interfaces with other components of content system 100 to provide various functions. For example, VOD server 108 is communicates with the Billing system (BS) to report purchases, and to the Encryption Renewal System (ERS) to periodically request ECMs for pre-encrypted programs.

VOD server 108 typically resides within the cable system. Nonetheless, the exact location of the equipment constituting VOD server 108 is variable and does not affect the workings of the present invention. In a cable system built using hybrid fiber-coax (HFC) technology, VOD server 108 may be located at the head-end. Alternatively, VOD server 108 may have equipment in multiple locations, including the head end and the distribution hubs in the network. VOD server 108 may be located off-site and may serve one or more cable systems. VOD systems generally are well known in the art and need not be described in detail. Thus, VOD server 108 may comprise off-the-shelf items including hardware and software and/or customizable software.

As noted, content system 100 includes a conditional access system (CAS) 110. CAS 110 permits access to encrypted content by subscriber terminals by provisioning the subscriber terminals with EMMs, and providing information for generating ECMs for non-VOD services. Other functions of CAS 110 include controlling real-time encryption devices in the cable-system; reporting the occurrence of periodical key changes to the encryption renewal system, and transmitting cable system-specific cryptographic parameters (e.g., periodical keys) to the encryption renewal system to enable ECM retrofitting. Upon expiration of a key, no set-tops can decrypt content until the periodical key is renewed. CAS 110 may be located either on site or off site, and may serve multiple cable systems, in which case CAS 110 acts as multiple logical conditional access systems. Furthermore, CAS 110 interfaces with the Billing System to obtain authorization information about each subscriber, and to report non-VOD purchases to the Billing System. CAS systems are well known in the art and may comprise off-the-shelf items.

BS 106 interfaces with both VOD server 108 and CAS 110 to provide the following functions: (1) accepting subscription and service change requests from subscribers; (2) maintaining subscriber account information; (3) billing subscribers; (4) interfacing with VOD server 108 to provide the latter with subscriber authorization status, and to collect video on-demand purchase information from the latter; and (5) providing subscriber authorization status, service and event definition information, and to collect non-VOD purchase information from CAS 110. Although not shown, BS 106 may be several physical entities located at separate geographical locations.

Distribution Network 112 is a point-to-point network that distributes signals to all or a subset of the subscribers in the system. Distribution Network 112 may comprise an edge QAM modulator and a hybrid fiber-coax (HFC) network, for example. The edge modulator receives Ethernet frames that encapsulate transport packets, de-capsulate these frames and remove network jitter, implements modulation and, performs frequency up-conversion and transmits radio frequency signals representative of the transport stream packets to end users over the HFC network. In the HFC network, the transport stream is distributed from the head end (central office) to a number of second level facilities (distribution hubs). Each hub in turn distributes carriers to a number of fiber nodes. In a typical arrangement, the distribution medium from the head-end down to the fiber node level is optical fibers. Subscriber homes are connected to fiber hubs via coaxial cables. At some level of distribution facility (hub, fiber node, or other distribution facilities), video on-demand carriers are broadcast to a subset of the subscriber terminal population served by the distribution facility. This typically occurs at the fiber node level. This arrangement allows the reuse of video on-demand carrier frequencies, say across fiber nodes, because different fiber nodes broadcast different video on-demand carriers to the subscribers they serve.

Instead of using an edge modulator and an HFC network, distribution network 112 may alternatively comprise, for example, a packet-switched network that is capable of delivering IP packets directly to the STB 120 using, for example, a cable data network, PON, or the like.

Interactive network 114 communicates with VOD server 108 and STB 120 to provide a two-way communication capability between the subscriber terminals and the VOD server 108. Interactive Network 114 may share some of the physical infrastructure of Distribution Network 112. In this case STB 120 will generally by equipped with a return channel capability such as, for example, an RF return channel, an IP return channel or a wireless channel. In some cases the return channel may operate over a LAN using any suitable suite of communication protocols (e.g., IP-based Ethernet, MoCA, powerline-based systems).

System architecture 100 includes a Session Resource Manager (SRM) 130 (sometimes referred to as a Global Session Resource Manager) for managing the resources in the system. Generally, the SRM 130 maintains a directory of system elements to facilitate the set-up of communication paths between system 100 elements. In operation, upon receiving a request from set top box 120 to establish an on-demand session to view a program, the SRM 130 examines the session setup request and the content requested to determine the network resources that are required to fulfill the request. For instance, the SRM 130 may determine that the STB 120 is requesting an MPEG movie file encoded at 3.5 megabits/sec. The SRM 130 will then instruct the VOD server 108 to set up a network stream through which to transmit the movie content, which resides in a disk file or memory at the VOD server 108. The network path must be capable of transmitting 3.5 megabits/sec so that the movie can be transmitted. Additionally, the path must be able to communicate with the STB 120 that requested the movie, as it will be appreciated that not all communication paths that provide 3.5 megabits/sec bandwidth will be available to communicate with the STB 120. The SRM 130 determines if the network contains the resources required to fulfill the request, and, if so, reserves the network resources so that the request can be fulfilled. The SRM 130 sends a session response to the STB 120, which tells the application in the STB 120 that the VOD server 108 is ready to execute the session. The session response also advises the STB 120 where to find the content e.g., by providing program tuning information). Finally, after the SRM 130 has performed the aforementioned tasks, the content is transmitted over the distribution network 112 to the STB requesting the session in accordance with the destination address provided by the SRM 130.

In a real-time encryption VOD system that employs a conventional encryptor rather than the transport encryptor described herein, the SRM 130 must also be in communication with the encryptor so that the SRM can manage encryptor resources and provide the encryptor with the destination address of the STB or network element to which the content should be sent. The SRM 130 also needs to instruct the encryptor 102 to encrypt the content received from the VOD server 108 prior to forwarding the content to the distribution network 112. The protocols used by the SRM 130 to coordinate activities among the VOD server 108, the encryptor 102 and the STB 120 (or a network element within the distribution network 112) generally reside at the application level and are application specific. On the other hand, the system described above in connection with FIG. 1 does not require communication between the SRM 130 and the transport encryptor 102, thus reducing the degree of coordination that is needed among the various elements of the VOD system. As one example of the type of communication that can be eliminated, the SRM 130 no longer needs to provide the transport encryptor with the destination address of the STB since this information now comes directly from the VOD server 108. As another example, the SRM 130 does not need to assign individual transport encryptors with particular content streams for encryption.

Figure 2:
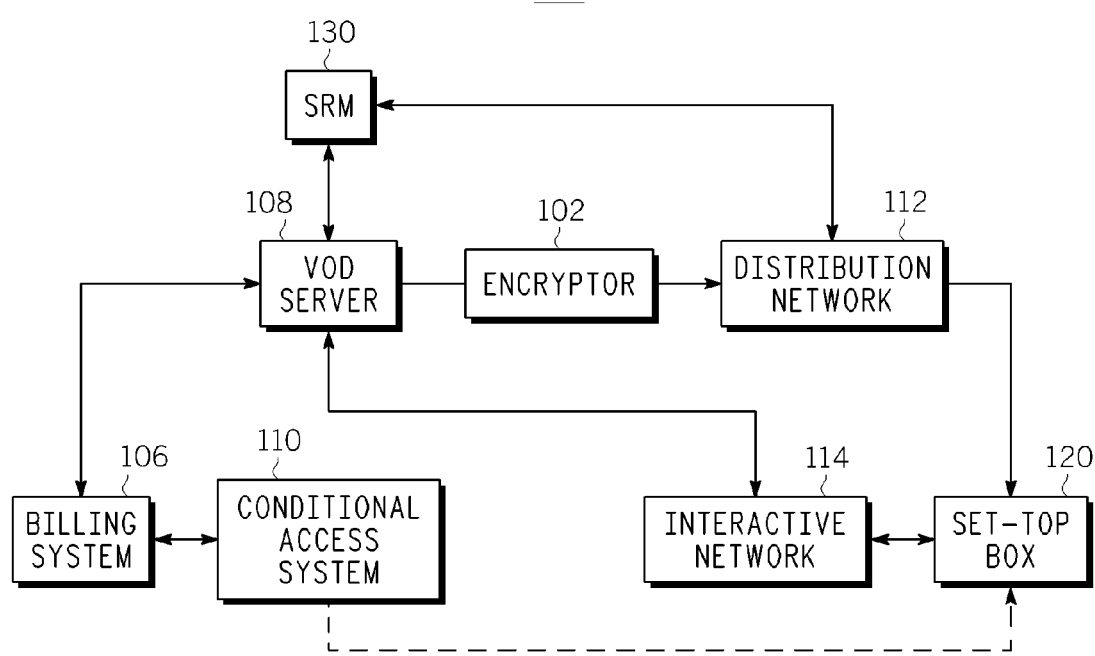
FIG. 2 shows an alternative example of a system architecture for delivering encrypted video on-demand content to a subscriber during a VOD session.

In some embodiments the degree of coordination that is needed among the various elements of the VOD system can be reduced by employing common tier encryption. Such a system is depicted in FIG. 2. In FIGS. 1 and 2 as well as the figures that follow like elements are denoted by like reference numerals. In common tier encryption a common key is used to encrypt content associated with services in which the client (e.g., set-top box) has been previously provided with any authentication information required to decrypt the content associated with those services. The conditional access system 110, which may still be used to provision common tier encryption, can communicate with STB 120 in any appropriate manner (as indicated by the dashed line in FIG. 2). For instance, the conditional access system can use out-of-band signaling over the cable plant (e.g., distribution network 112, interactive network 114, or a combination thereof) for this purpose.

The embodiments shown in FIGS. 1 and 2 significantly reduce the degree of coordination that is needed among the various components of the VOD system. For instance, VOD server 108 no longer needs to communicate with the transport encryptor 102 or an encryption renewal system using application-specific protocols. Likewise, the session resource manager 130 no longer needs to communicate with the transport encryptor 102 or an encryption renewal system. As a result, it becomes much easier to deploy the transport encryptor 102 into any VOD system provided by any VOD vendor since the extent to which application-specific protocols are used in the system has been reduced, and eliminated in the case of the transport encryptor 102.

Figure 3:
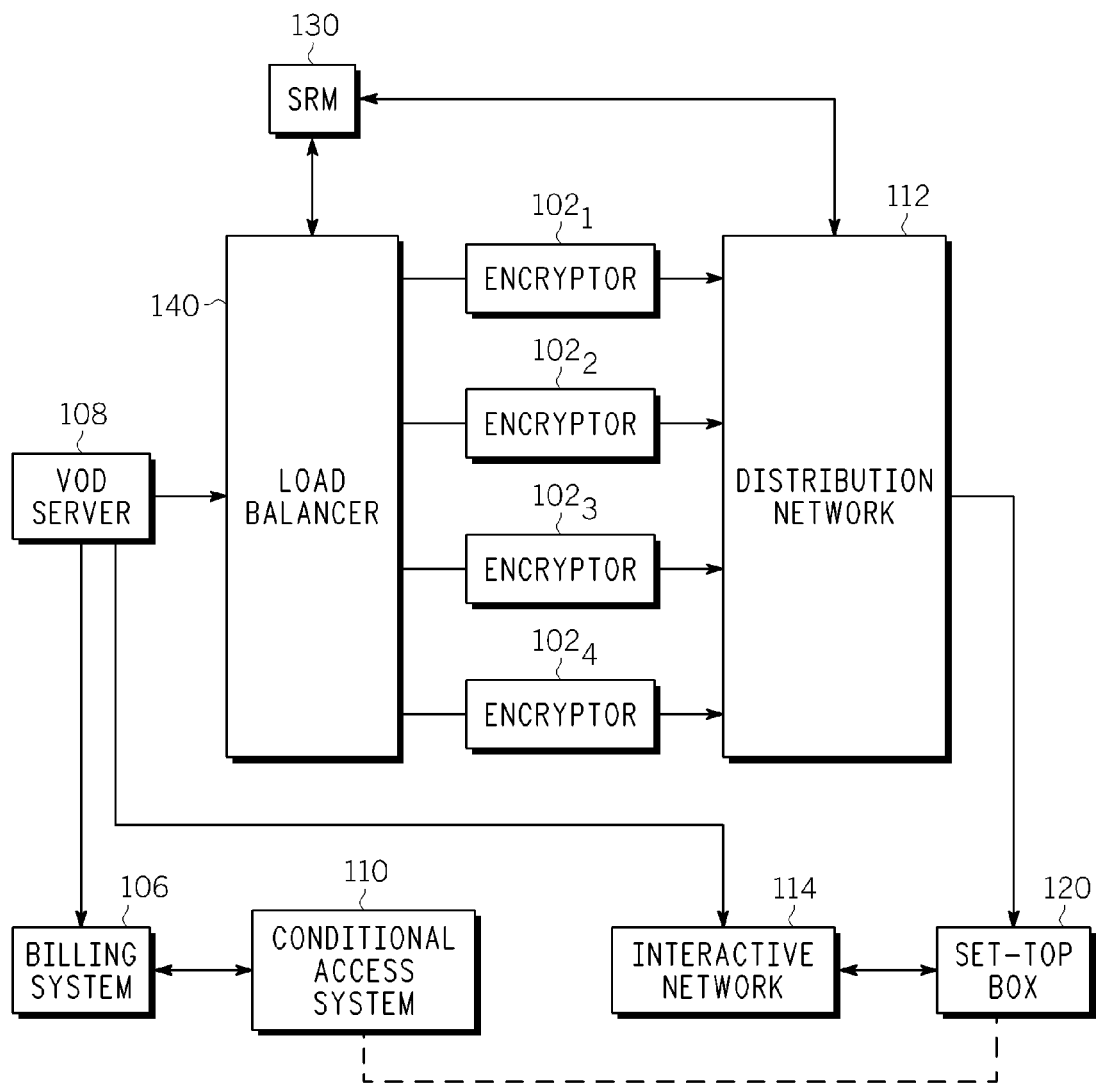
FIG. 3 shows yet another example of a system architecture for delivering encrypted video on-demand content to a subscriber during a VOD session.

In some cases it may be desirable to employ a load-balancer such as load-balancer 140 shown in FIG. 3. The load-balancer 140 is particularly advantageous when there are multiple transport encryptors available in the system such as transport encryptors $102_1$, $102_2$, $102_3$ and $102_4$ in FIG. 3. Load balancer 140 receives the unencrypted transport stream from the VOD server 108 and forwards it to an appropriate transport encryptor in a controlled manner that avoids exceeding the throughput capacity of the transport paths to the transport encryptor. In addition, the load-balancer 140 can distribute multiple unencrypted transport streams requested by different subscribers among the various transport encryptors. Similarly, the load balancer 140 can limit distribution of the unencrypted transport stream based on the resource capabilities (e.g., aggregate bandwidth) of the video on-demand server. Alternatively, all the transport streams designated for a particular subscriber can be sent to the same transport encryptor. The transport streams may be distributed in accordance with any appropriate algorithm, such as a least load algorithm that minimizes the load imposed on any given transport encryptor. The load-balancer 140 can also ensure that the number of different unencrypted transport streams forwarded to any given transport encryptor does not exceed the maximum number of streams that the transport encryptor can process at any one time. Other parameters that may be monitored and controlled by the load-balancer 140 include the bandwidth needed to forward the transport streams to each transport encryptor and any time-out periods that may be exceeded when there is no unencrypted transport stream being received. Depending on the particulars of the video on-demand server that is used, the load balancer may also provide for session based streaming using the packets' destination IP address or the UDP port or a combination of thereof. As previously mentioned, the transport encryptor can also maintain the order of incoming and outgoing packets.

Figure 4:
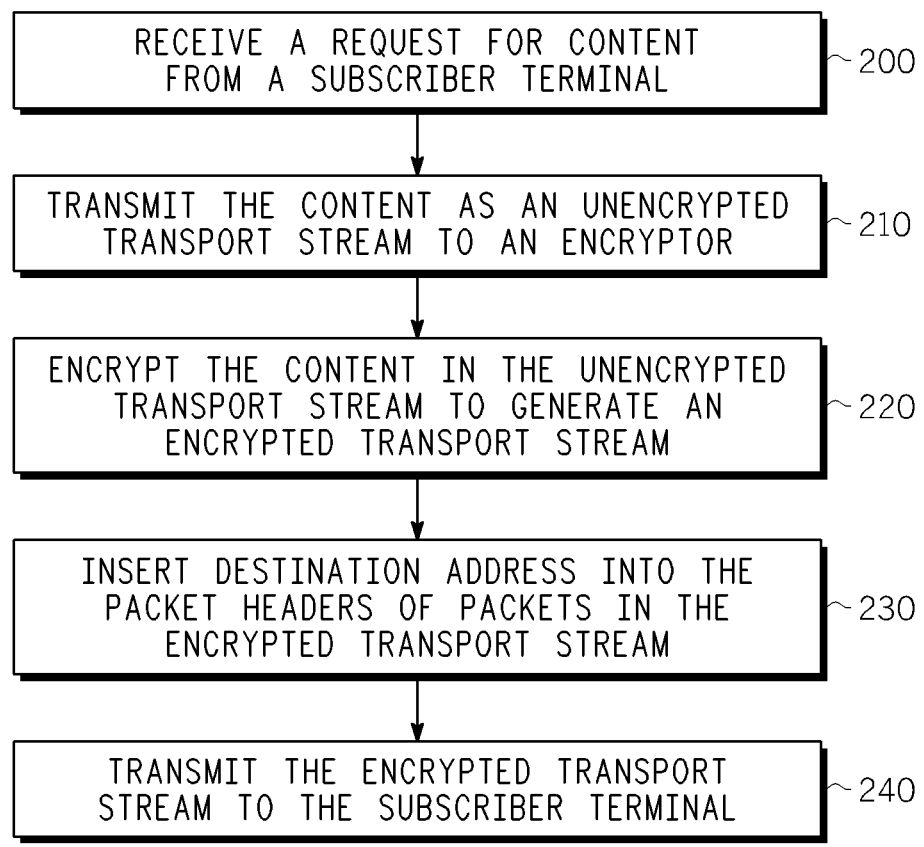
FIG. 4 is a flowchart showing one example of method for delivering encrypted content to a subscriber terminal on-demand through a communication network.

FIG. 4 is a flowchart showing one example of method for delivering encrypted content to a subscriber terminal on-demand through a communication network. The method begins in step 200 when the SRM 130 receives a request for content from the subscriber terminal. In response to the request, in step 210 the SRM directs the video server 108 to transmit the content as an unencrypted transport stream to an encryptor. The packets in the unencrypted transport stream include a header with a destination address associated with the subscriber terminal. The encryptor 102 encrypts the content in the unencrypted transport stream to generate an encrypted transport stream in step 220. In step 230 the encryptor also inserts in the packet headers of the packets in the encrypted transport stream the destination address associated with the subscriber terminal obtained from the packet headers in the unencrypted transport stream. Finally, in step 240 the encrypted transport stream is transmitted to the subscriber terminal over the communication network.

In some particular examples the VOD server 108, encryptor 102 and the edge QAM modulator in the distribution network 114 may be in communication with one another using IP over Ethernet protocols. Because the VOD server 108 and edge QAM modulator generally reside on different networks, the VOD server 108 will need to transmit the unencrypted transport stream through a router using the modulator's destination IP address. In this case the encryptor 102 (or load-balancer 140, if employed) effectively serves as the gateway router that will receive the transport stream from the VOD server 108 and forward it on to the edge QAM modulator in the distribution network 112. Accordingly, the VOD server 108 is configured with the IP address of the encryptor (or the load-balancer) as its default gateway IP address.

When the VOD server 108 is to send a transport stream to the edge QAM modulator, it will first send an Address Resolution Protocol (ARP) request to its default gateway (i.e., the encryptor 102). The ARP request will ask for the Ethernet MAC address of the default gateway. In response, the default gateway—encryptor 102—will send an ARP reply in which its Ethernet MAC address will be provided. The VOD server 108 can now send an Ethernet frame to the encryptor 102 using the encryptor's Ethernet MAC address. The Ethernet frame will encapsulate an IP datagram having as its destination address the IP address of the edge QAM modulator. The IP datagram will include the content (in the form of e.g., MPEG packets) that is destined for the subscriber. When the encryptor 102 receives the Ethernet frame it will extract the content and encrypt them in the appropriate manner using, for example, common tier encryption. The encryptor 102 will then reconstruct the IP datagram, using as its destination address the destination IP address provided by the VOD server 108.

While the preceding example has been described in terms of IP over Ethernet, the same principles are more generally applicable to other networks operating in accordance with any network level and physical level protocols.

The system architecture described herein provides a number of advantages over previously available encryption schemes. For example, since real-time encryption is employed, there is no need to pre-encrypt the content using an Off-Line Encryption Station (OLES) prior to loading it onto the VOD servers. Likewise, by avoiding the use of pre-encryption, there is no need to use an Encryption Renewal System (ERS) to generate Entitlement Control Messages (ECMs), or to create processes to retrieve ECMs from the ERS and insert them into the VOD stream. Moreover, the use of additional protocols is unnecessary. For example, there is no need to use a signaling protocol between the SRM and encryptor to set up the encryption process and to control the input to output routing process. Because of the way the encryptor routes transport streams, the SRM does not need to instruct the encryptor where the next hop datagram stream should be sent.

Because the content is encrypted using common tier encryption, the content is protected from QAM receivers that can frequency scan QAM channels, which could otherwise allow unauthorized viewers access to the content. For example, this can prevent the unintentional acquisition of adult content. The system architecture described herein avoids this problem without having to implement Session Based Encryption and without the need to encrypt the content for each and every subscriber's unique STB under the control of the SRM.

Another important advantage provided by the system architecture shown herein is that many legacy edge QAM modulators cannot themselves perform encryption. While it may be possible to replace these modulators with modulators that do perform encryption, this will often not be a cost-effective solution. Accordingly, it will often be more desirable to encrypt the content upstream of the modulators in the manner described above.

Yet another important advantage is that it now becomes relatively easy for a system operator such as an MSO to add additional encryption capability as the capacity of their VOD server or servers continues to increase. This can be accomplished with the use of a load balancer by simply adding additional encryptors to the system as needed. In particular, there is no need to establish signaling protocols between the SRM and each encryptor that is added. In fact, the SRM does not need to be configured with any information concerning the additional encryptors.

Finally, this system architecture makes it quite easy to overlay encryption onto a pre-existing system that does not perform real-time encryption. This can be achieved because the encryptors are effectively invisible to the SRM, the VOD server, and the distribution network. Each of these components operates in exactly the same way with or without the use of encryption.

While the methods and techniques set forth above have been described in the context of a video on-demand system architecture, it should be noted that these methods and techniques are also applicable to other system architectures, and in particular to other types of on-demand architectures. For instance, another example of such a system architecture is a switched digital video system.

Switched digital video (SDV) refers to an arrangement in which broadcast channels are only switched onto the network when they are requested by one or more subscribers, thereby allowing system operators to save bandwidth over their distribution network. In conventional cable or satellite broadcast systems, every broadcast channel is always available to all authorized subscribers. In contrast, a switched digital video channel is only available when requested by one or more authorized subscribers. Also, unlike video on-demand, which switches a singlecast interactive program to a user, switched digital video switches broadcast streams, making each stream available to one or more subscribers who simply join the broadcast stream just as they would with normal broadcast services. That is, once a switched service is streamed to a subscriber, subsequent subscribers on that same network can tune to the same stream as the first subscriber.

Figure 5:
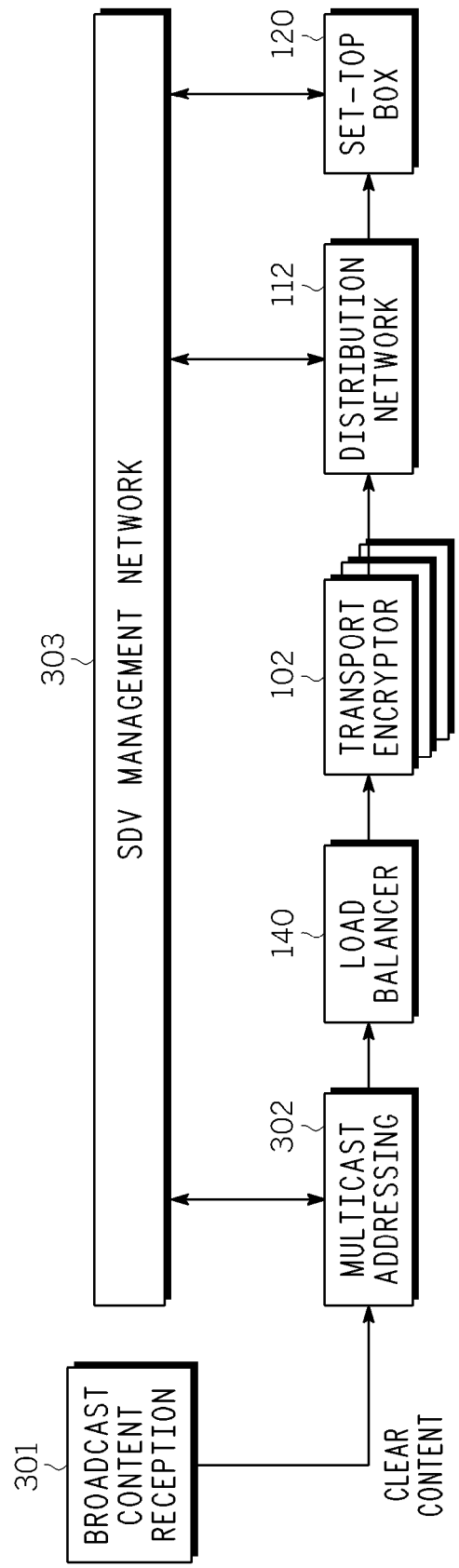
FIG. 5 shows one example of a system architecture for delivering switched digital video content to a subscriber.

FIG. 5 shows one example of a switched digital video architecture in which the content to be broadcast is located in, or received by, broadcast content source 301. Broadcast content source 301 may include, by way of example, satellite receivers, off-air receivers and/or content storage devices such as servers. In the context of a CATV system, broadcast content source 301 may be located in the headend, for example. A SDV manager 303 is used to determine which SDV transport streams are active at any time and for directing STBs 120 to the appropriate stream. The SDV manager 303 also keeps track of which subscribers are watching which channels and it communicates with the distribution network 112 so that the content can be switched on and off under the control of the SDV manager 303. In addition, all subscriber requests for a switched digital channel go through the SDV manager 303. In the example of FIG. 5 the switched digital channels are transmitted from the broadcast content source 301 over an IP network 302 using an IP multicast destination address. The IP network 302 forwards the switched digital channels either directly to the transport encryptor 102 or the load balancer 140, if employed. The content is then encrypted by the encryptor 102 and transmitted to the STB 120 over the distribution network 112 using an appropriate protocol for managing membership in multicast groups. One example of a suitable protocol that may be used for this purpose is the Internet Group Management Protocol (IGMP). As in the VOD system architecture, the transport encryptor 102 can perform real-time encryption without participating in switching management and content distribution processes performed by the SDV manager 303 and the distribution network 112, respectively.

Although a specific architecture has been described in connection with FIGS. 1-3 and 5, including specific functional elements and relationships, it is contemplated that the systems and methods herein may be implemented in a variety of ways. For example, functional elements may be packaged together or individually, or may be implemented by fewer, more or different devices, and may be either integrated within other products, or adapted to work with other products externally. When one element is indicated as being responsive to another element, the elements may be directly or indirectly coupled.

The processes described above, including those shown in FIG. 4, may be implemented in a general, multi-purpose or single purpose processor. Such a processor will execute instructions, either at the assembly, compiled or machine-level, to perform that process. Those instructions can be written by one of ordinary skill in the art following the descriptions herein and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

The invention claimed is:

1. A method for delivering encrypted video on-demand content to a subscriber terminal in a cable television (CATV) network, the method comprising:

in response to a request received at a headend or distribution hub in the CATV network where video-on-demand content is loaded on to a video on-demand server as unencrypted content, the request for video on-demand content generated by a subscriber terminal, providing a communication path for transmitting unencrypted content from the video on-demand server to a load balancer and at least one encryptor transparently overlaid to an existing video on-demand management system having a video on-demand resource manager and its own encryptor, the communication path bypassing an existing communication path between the video on-demand resource manager and corresponding encryptor for reducing a degree of protocol-dependent communication for encryption by the existing video on-demand management system;

receiving unencrypted transport packets of the unencrypted content stored in the on-demand server and routed over the communication path that bypasses the existing communication path between the video on-demand resource manager and encryptor;

receiving a destination address associated with the requesting subscriber terminal routed by the on-demand server bypassing a communication of the destination address to the existing encryptor in the video on-demand management system, wherein the overlaid load balancer instead of the video on-demand management system manages encryption of the unencrypted content loaded in to the video-on-demand server by:
- selecting an encryptor from the at least one overlaid encryptor for encrypting the unencrypted transport stream;
- transmitting the unencrypted transport packets of the unencrypted content to the selected overlaid encryptor, the overlaid encryptor maintaining a packet order of the unencrypted transport packets from reception to distribution;
- encrypting the unencrypted content to generate an encrypted transport stream; and
- transmitting, independently from the existing video on-demand resource manager and encryptor communication path, the encrypted transport packets based on the destination address routed by the on-demand server in the same order as received to the requesting subscriber terminal associated with the destination address over the CATV network.

2. The method of claim 1 wherein the content is encrypted using common tier encryption.

3. The method of claim 1 wherein the destination address is an IP address of the subscriber terminal.

4. The method of claim 1 wherein the destination address is an IP address of a network element in the CATV network which forwards the encrypted transport stream to the subscriber terminal.

5. The method of claim 1 further comprising maintaining in the encrypted transport stream a packet order existing in the unencrypted transport stream.

6. The method of claim 1 wherein the encryptor comprises a plurality of transport encryptors and further wherein the unencrypted transport stream is transmitted to a selected one of the transport encryptors based on the subscriber terminal to which the encrypted transport stream is to be transmitted.

7. The method of claim 5 wherein the packet order existing in the unencrypted transport stream is determined on a per stream basis.

8. The method of claim 5 wherein the packet order existing in the unencrypted transport stream is determined on a destination address basis.

9. A video on-demand system, comprising: one or more hardware processor, comprising:
- a session resource manager for coordinating a video on-demand session in which content is requested by a subscriber terminal, wherein, in response to a request received at a headend or distribution hub in a cable television (CATV) network where video-on-demand content is loaded on to a video on-demand server as unencrypted content, the session resource manager provides a communication path for transmitting unencrypted content from the video on-demand server to a load balancer and at least one of a plurality of encryptors transparently overlaid to an existing video on-demand management system having a video on-demand resource manager and its own encryptor,
- wherein the communication path bypasses an existing communication path between the video on-demand server and the existing video on-demand management system for reducing a degree of protocol-dependent communication for encryption by the existing video on-demand management system;
- the overlaid load balancer:
  - receives unencrypted transport packets of the unencrypted content stored in the video on-demand server and routed over the communication path that bypasses the existing communication path to the video on-demand resource manager and encryptor,
  - receives a destination address associated with the requesting subscriber terminal routed by the on-demand server bypassing a communication of the destination address to the existing encryptor in the video on-demand management system, and
  - operatively couples the video on-demand server to the plurality of overlaid transport encryptors for selectively distributing unencrypted transport streams among the transport encryptors,
- wherein the overlaid load balancer instead of the video on-demand management system manages encryption of the unencrypted content loaded in to the video-on-demand server by:
- selecting an encryptor from the at least one overlaid encryptor for encrypting the unencrypted transport stream;
- transmitting the unencrypted transport packets of the unencrypted content to the selected overlaid encryptor, the overlaid encryptor maintaining a packet order of the unencrypted transport packets from reception to distribution;
- encrypting the unencrypted content to generate an encrypted transport stream; and transmitting, independently from the existing video on-demand resource manager and encryptor communication path, the encrypted transport packets based on the destination address routed by the on-demand server in the same order as received to the requesting subscriber terminal associated with the destination address over the CATV network.

10. The video on-demand system of claim 9 wherein the transport encryptor is further configured to maintain packet order in each transport stream.

11. The video on-demand system of claim 9 further comprising a conditional access system for providing a key to the subscriber terminal to access the encrypted transport stream, wherein the conditional access system employs common tier encryption.

12. The video on-demand system of claim 9 wherein unencrypted transport streams designated for a given subscriber terminal are distributed to a common transport encryptor.

13. The video on-demand system of claim 9 wherein the load balancer limits distribution of the unencrypted transport stream based on resource capabilities of the video on-demand server.

14. The video on-demand system of claim 9, wherein the video on-demand system is a switched digital video (SDV) system, wherein the session manager is a SDV manager for coordinating a SDV session in which an SDV channel is requested by a subscriber terminal, wherein the encrypted content from the load balancer is broadcast over the SDV channel to one or more subscriber terminals.

15. The switched digital video system of claim 14 wherein unencrypted transport streams designated for a SDV channel are distributed to a common transport encryptor.

16. The switched digital video system of claim 14 wherein the load balancer limits distribution of the unencrypted transport stream based on resource capabilities of a content source.

* * * * *